United States Patent [19]
Ostrander et al.

[11] 3,861,458
[45] Jan. 21, 1975

[54] MULTI-HEAD INFRA-RED RAY DETECTOR

[75] Inventors: George K. Ostrander, Angelica; Donald F. Wixson, Wellsville, both of N.Y.

[73] Assignee: The Air Preheater Company, Inc., Wellsville, N.Y.

[22] Filed: June 4, 1973

[21] Appl. No.: 366,950

[52] U.S. Cl.............. 165/5, 165/11, 250/342, 250/349, 250/571
[51] Int. Cl............................................ F28d 19/00
[58] Field of Search ............ 165/5, 11, 95; 250/342, 250/349, 571

[56] References Cited
UNITED STATES PATENTS

| | | | |
|---|---|---|---|
| 3,183,961 | 5/1965 | Brandt | 165/5 X |
| 3,307,968 | 3/1967 | Schnedler | 250/571 X |
| 3,467,175 | 9/1969 | O'Connor | 165/11 |
| 3,535,536 | 10/1970 | Pernau | 250/571 |
| 3,730,259 | 5/1973 | Wixson et al. | 165/5 |

FOREIGN PATENTS OR APPLICATIONS

| | | | |
|---|---|---|---|
| 1,126,466 | 9/1968 | Great Britain | 165/5 |
| 158,644 | 7/1962 | U.S.S.R. | 165/5 |

*Primary Examiner*—Albert W. Davis, Jr.
*Attorney, Agent, or Firm*—Wayne H. Lang

[57] ABSTRACT

An arrangement by which "hot-spots" or developing fires in apparatus having a matrix therein are detected before the high temperatures resulting therefrom are permitted to impair the integrity of the apparatus. A plurality of independent infra-red ray detectors are provided to continuously view independently adjacent sections of the apparatus to obtain an indication of the normal output of infra-red rays emitted therefrom. Any change in the output of infra red rays is immediately noted by each detector as a significant variation from the normal signal received thereby.

7 Claims, 1 Drawing Figure

PATENTED JAN 21 1975
3,861,458
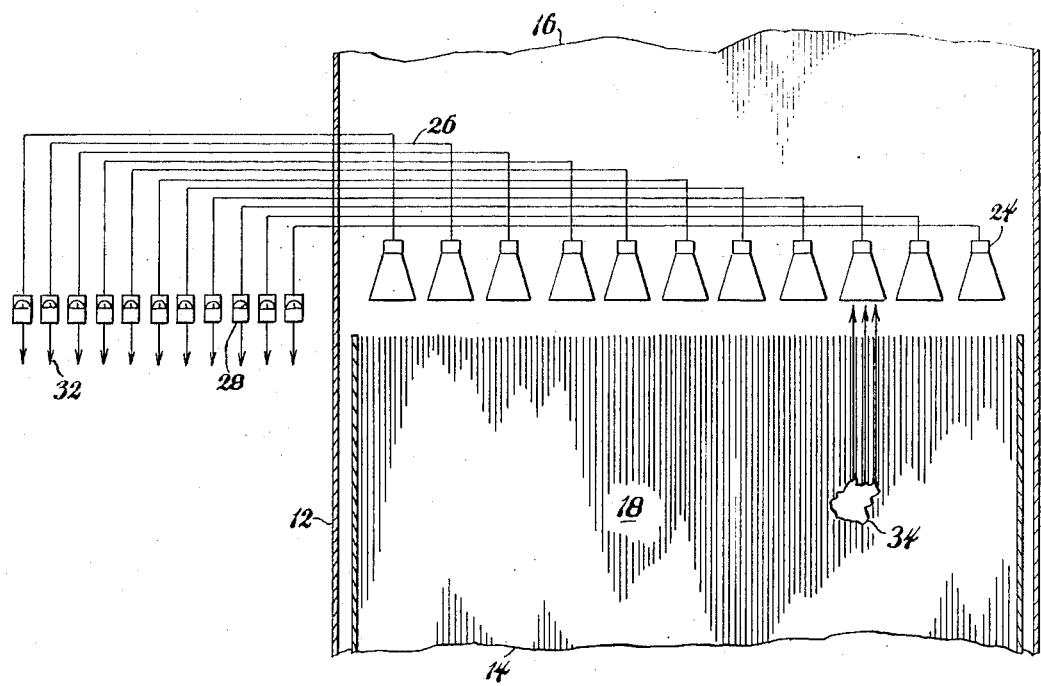

MULTI-HEAD INFRA-RED RAY DETECTOR

BACKGROUND OF THE INVENTION

1. Field of the Invention

Frequently hot gases are directed through ductwork defining a passageway containing a heat exchanger matrix, boiler tubes, dust collectors, dryers, kilns, curing ovens or other apparatus processing or utilizing the hot gas. As the hot gas traverses the ductwork unburned fuel or soot is frequently deposited on the apparatus or on the walls of the ductwork itself. These deposits may in a short time build up to a point where air or gas flow will be partially restricted. Moreover, heat will frequently begin to be exothermically generated in such deposits to a point where the deposits will glow and cause an incipient fire or a "hot-spot." If undetected, the hot-spot will rapidly increase in temperature where the surrounding metal will itself ignite causing catastrophic results to the surrounding structure.

2. Description of Prior Art

Known prior art is represented by our previous U.S. Pat. No. 3,730,259 dated May 1, 1973. In this patent a signal from an infra-red detector was used to detect a potential hot-spot in a regenerative air preheater. Signal strength received by the detector was inherently weak because of the substantial distance traveled by the direct and reflected infra-red rays. Moreover, in the case of a mirror that was moved across a target, response to a hot-spot condition was uncertain or at best slow thereby delaying control efforts until some damage had already been done.

More importantly however, when viewing an extensive matrix having a greater scope than that normally viewed by a single infra-red ray detector, some means of converging the rays to a single detector was required. Such converging means might take the form of a parabolic mirror, a condensing lens, or an arrangement of multiple plane mirrors that would receive and then transmit all the infra-red rays emitted by the matrix. The signal strength of an incipient "hot-spot" would frequently become but an insignificant portion of the total signal strength radiated by the matrix. Thus while in theory the device of the invention would be capable of detecting a potential hot-spot, the device was not always responsive to the small changes in infra-red ray radiation that would indicate potential fires.

SUMMARY OF THE INVENTION

This invention therefore relates to apparatus having a multiplicity of adjacent infra-red ray detectors that each continuously view a section of the apparatus to observe minute changes in the radiation of infra-red rays to detect an incipient hot-spot or fire. Inasmuch as there are a plurality of adjacent but independent detectors that together provide coverage of a potential fire area, the response to a hot-spot is rapid and complete. Moreover, each infra-red ray detector is itself positioned closely adjacent an incipient hot-spot so the signal strength received thereby is near maximum value. Furthermore, a variation in infra-red signal strength received by any detector is compared only to the average signal being received by the detector and not with the total infra-red signal strength of the entire apparatus. Thus any variation in signal strength will comprise a substantial portion of the signal strength received by that detector.

The chief objective of my invention therefore is to provide a multiplicity of infra-red detectors that directly view laterally adjacent sections of apparatus and are acutely sensitive to infra-red rays that denote a change in infra-red ray emission thereby.

BRIEF DESCRIPTION OF THE DRAWING

The single FIGURE shown in a side elevation of an elongate housing including a multiplicity of infra-red ray detectors having a corresponding number of matched comparators.

DESCRIPTION OF THE PREFERRED EMBODIMENT

In the drawings a housing 12 is provided with an inlet 14 and an outlet 16 adapted to direct a hot gas stream therethrough. The housing contains a mass of permeable heat absorbing material 18 that absorbs heat from the hot gas and then gives it up to cooler air as it in turn is directed therethrough by a valving arrangement (not shown), since it in no way contributes to the invention.

As the hot gases flow through the housing particulate matter including unburned products of combustion frequently are deposited on the surface of the matrix so that in time they build up and block passage of the gas stream. At the same time, the temperature of the deposits and the matrix adjacent thereto may increase rapidly because it is not being subjected to a flow of cooling gas. As temperatures reach approximately 700° F., the process becomes exothermic and heat is generated in the deposits to a point where an active fire occurs in the deposits and the surrounding metal of the matrix or the housing itself will burn as the temperature rises to approximately 1,400° F.

Testing has shown that fires may start as small hot spots in the matrix such as those shown by numeral 34 where small accumulations of particulate matter and liquid vapors first occur. These hot spots will build up rapidly in size and temperature to a diameter of approximately 6 inches and to a temperature of nearly 1,400° F. When this temperature is reached and the metal of the housing and the matrix itself ignites and rapidly spreads to adjacent structure with generally disastrous results.

Inasmuch as such deposits first occur well within the body of the heat exchanger or other apparatus as harmless hot spots, this invention is directed to apparatus that detects incipient hot spots or potential fires far in advance of the occurrence of an actual fire. Moreover, the unique arrangement of multiple detector heads and independent comparators defined herein is adapted to provide greater sensitivity to incipient hot spots and more rapid response to potential fires than was heretofore available.

According to this invention there is provided an array or an arrangement of a series of infra-red ray detectors 24 that are laterally adjacent one another and adapted to view a predetermined space through which hot gases are directed. The detectors may be arranged in spaced relation to view a cross-sectional entirety of the housing whereby a hot spot occurring anywhere therein will be immediately viewed by one of the detectors. In the practical arrangement shown in the drawing, a matrix 18 of heat absorbent material is moved across a duct 12 having a flow of hot gas entering at 14 and exhausting at 16. A lateral series of detectors 24 are supported by a single holding means or lateral bracket (not shown)

and thus adapted to view an incipient hot spot in the matrix almost immediately as it occurs.

The infra-red signal induced by a hot-spot 34 acting upon a particular detector 24 is transmitted via one of transmission lines 26 to a specific comparator 28 that is connected thereto. Inasmuch as there is a comparator for each detector, the base signal received by each comparator results from the base average temperature viewed by each detector 24, and any deviation therefrom becomes a substantial variation that is a significant fraction of the base average.

In operation, the base average output of infra-red energy from the matrix 18 reaching a detector 24 may, for example, be 6 units of energy as denoted by its corresponding comparator 28. If a hot-spot such as that shown at 34 should increase in infra-red radiation to 9 units of energy, the increase would amount to 3 units or one-half or 50 percent of the base amount. This is a very significant increase and it would be easily identified and would provide sufficient signal strength to actuate any suitable control measure.

Although the comparator 28 is shown as having a meter indicating the signal strength of a corresponding detector 24, an outlet 32 therefrom may logically be connected to any desired control device such as an audible signal or fire extinguishing means through a conventional amplifier (not shown).

Thus, while the invention has been described with reference to the embodiment shown in the drawing it is apparent that various changes may be made without departing from the spirit of the invention. It is therefor intended that all matter contained in the above description or shown in the accompanying drawings shall be interpreted as illustrative and not in a limiting sense.

We claim:

1. Apparatus having a housing provided with spaced inlet and outlet ports that direct the flow therethrough of a heating fluid, a mass of heat absorbent material in said housing intermediate the inlet and outlet ports adapted to be contacted by the heating fluid as it flows through the housing, a multiplicity of infra-red ray detectors viewing laterally adjacent sections of the material in said housing to each produce a base signal proportional to the infra-red rays received thereby, and a comparator for each detector adapted to simultaneously receive the base signal from each detector together with any variation thereof to note a change in the strength of the infra-red signal received by an individual detector from the base signal received thereby.

2. Apparatus having a housing provided with spaced infra-red ray detectors as defined in claim 1 wherein the infra-red detectors are oriented toward the mass of material in said housing.

3. Apparatus having a housing provided with spaced infra-red ray detectors as defined in claim 1 wherein multiple comparators are encased in a single housing.

4. Apparatus having a housing provided with spaced infra-red ray detectors viewing a mass of permeable material as defined in claim 1 wherein each comparator includes means that denotes only the output of infra-red ray strength from its corresponding detector.

5. Apparatus having a housing provided with spaced infra-red ray detectors as defined in claim 1 wherein the mass of material in said housing intermediate inlet and outlet ports is permeable to the flow of heating fluid.

6. Apparatus having a housing provided with spaced infra-red ray detectors as defined in claim 1 wherein the comparators for each detector include means for comparing the maximum strength of an infra-red ray signal from a detector with the base signal coming therefrom.

7. Apparatus having a housing provided with spaced infra-red ray detectors as defined in claim 1 wherein each detector is connected to an independent comparator that denotes changing signal strength received by said detector.

* * * * *